March 6, 1962 W. E. JAMES ET AL 3,023,452
SAUSAGE CASING STRIPPING DEVICES
Filed Dec. 10, 1959 3 Sheets-Sheet 1

INVENTORS
Theodore C. Riveer
William E. James
BY
*E. Hastings Ackley*
ATTORNEY

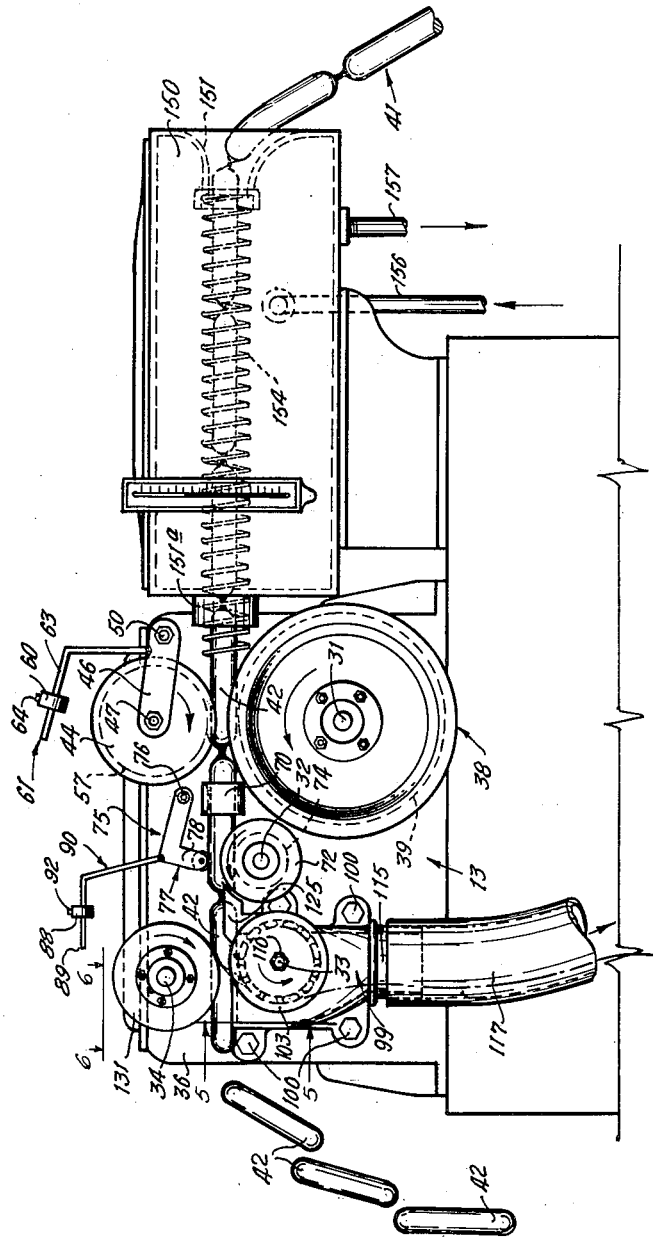

March 6, 1962 W. E. JAMES ET AL 3,023,452
SAUSAGE CASING STRIPPING DEVICES
Filed Dec. 10, 1959 3 Sheets-Sheet 3

INVENTORS
Theodore C. Riveer
William E. James
BY *E. Hastings Ackley*
ATTORNEY

United States Patent Office 3,023,452
Patented Mar. 6, 1962

3,023,452
SAUSAGE CASING STRIPPING DEVICES
William E. James, 502 N. 1st St., Durant, Okla., and
Theodore C. Riveer, 1506 Oak St., Grand Prairie, Tex.
Filed Dec. 10, 1959, Ser. No. 858,808
6 Claims. (Cl. 17—1)

This invention relates to a device for stripping casing from a string of sausages.

An object of this invention is to provide a new and improved device for stripping casing from a string of sausages.

Another object of the invention is to provide a device having a means for moving a string of sausages past a knife which slits the casing longitudinally along each sausage, a means for stripping the split casing from each sausage and a means for moving the stripped casing into the vacuum chamber, the sausages being freed by gravity from the stripped casing.

Still another object of the invention is to provide a device for stripping casing from a string of sausages having a means for moving a string of sausages encased in a casing which includes a rotatable drive wheel having a peripheral arcuate recess for receiving lower portions of the casings and a gravity actuated means for holding the sausages in the arcuate recess in driving engagement with the drive wheel.

A further object is to provide a device for stripping casing from a string of sausages which includes a rotatable drive wheel having a peripheral arcuate recess for receiving lower portions of the casings and a gravity actuated means for holding the sausages in driving engagement with the drive wheel wherein the gravity actuated means is provided with adjustable means for varying the force exerted by the gravity actuated device on the sausages.

A still further object is to provide a device for stripping casing from a string of sausages encased in the casing a drive and support wheel for supporting a sausage engaged by a casing slitting means disposed above the drive and support wheel.

Another object is to provide a device for stripping casing from a string of sausages encased in the casing having a drive and support wheel for supporting a sausage engaged by a casing slitting means disposed above the guide and support wheel and having means for varying the force with which the casing cutting or slitting means is held in engagement with the sausage supported by the guide and support wheel.

Another object is to provide a device for stripping casing from a string of sausages encased in the casing having a drive and support wheel for supporting a sausage engaged by a casing slitting means disposed above the guide and support wheel and having means for varying the force with which the casing cutting or slitting means is held in engagement with the sausage supported by the guide and support wheel wherein the means for adjustably varying the force with which the casing slitting or cutting means is held in engagement with the sausage includes a mass which is adjustably secured to a pivotally mounted lever.

A still further object of the invention is to provide a device for stripping casing from a string of sausages which includes a pair of laterally spaced casing stripping wheels for engaging the slit casing on opposite sides of the sausages and stripping the casing off the sausages for removal by a rotating vacuum wheel to which the stripped casing is caused to adhere by the application of a vacuum through apertures in the periphery of the wheel.

Additional objects and advantages of the invention will be readily apparent from the reading of the following description of a device constructed in accordance with the invention, and reference to the accompanying drawings thereof, wherein:

FIGURE 3 is an enlarged side view, taken from the side opposite to that shown in FIGURE 1, of the upper portion of the device for removing casing from sausages;

Figure 2:
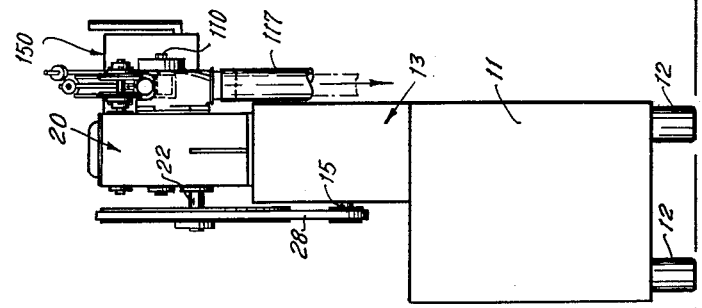
FIGURE 2 is an end view of the device illustrated in FIGURE 1.
Figure 1:
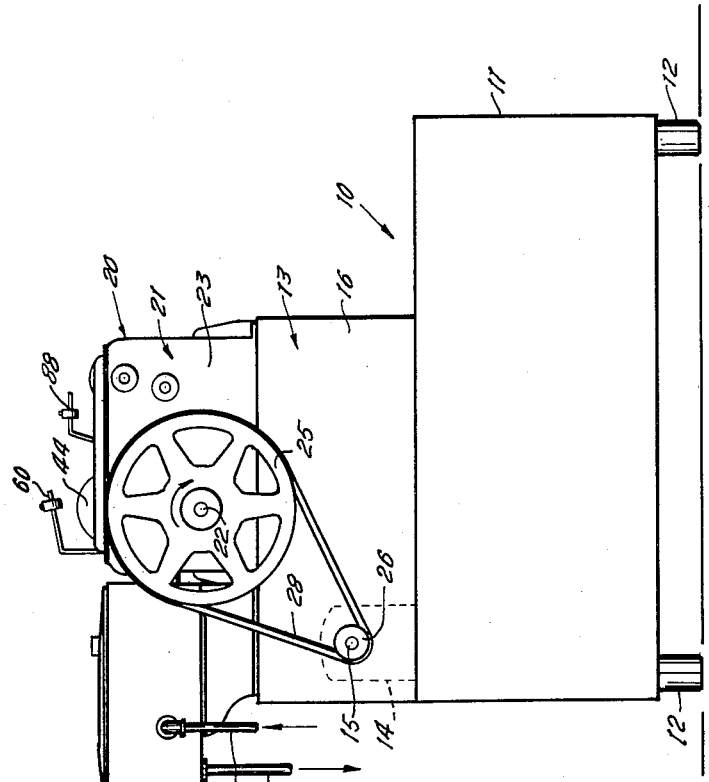
FIGURE 1 is a side plan view of the device for removing casing from sausages embodying the invention.
Figure 4:
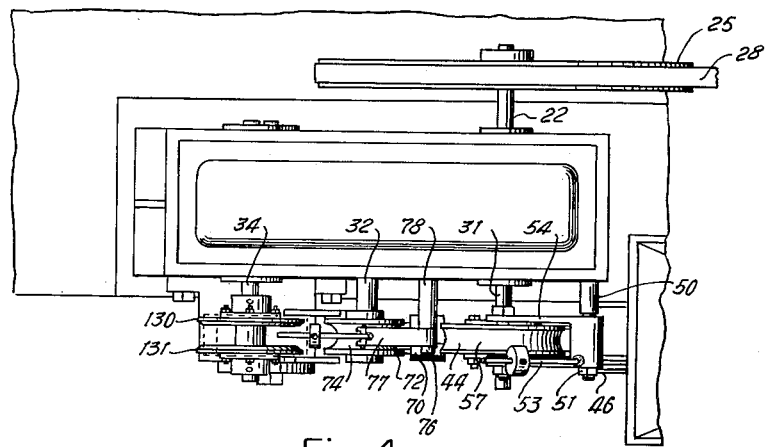
FIGURE 4 is a top plan view of a portion of the device illustrated in FIGURE 3.
Figure 5:
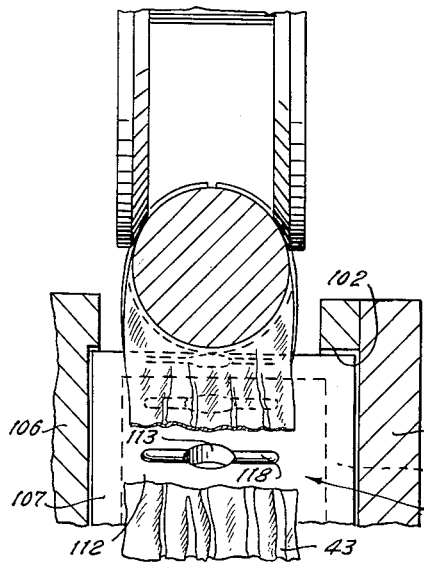
FIGURE 5 is a vertical, partly sectional, fragmentary enlarged view taken on line 5—5 of FIGURE 3 showing the manner in which the split casing is partially stripped from the sausages.

Referring now to the drawings, the device for removing casing from sausages includes a lower cabinet 11 supported by legs 12, on whose upper end is secured a motor housing 13 in which is disposed a motor 14 whose drive shaft 15 extends outwardly through the side wall 16 of the motor housing. A transmission assembly 20 includes a housing 21 secured to the top of the motor housing 13 in any suitable manner. The main or input shaft 22 of the transmission assembly 20 extends outwardly of the side wall 23 of the transmission housing and is provided with a large sheave or pulley 25 aligned with the small sheave or pulley 26 secured to the drive shaft 15 of the motor 14. A belt 28 extends about the pulleys whereby the motor 14 may rotate the main or input shaft 22 of the transmission assembly 20. The transmission assembly 20 is provided with a suitable gearing interposed between the input shaft 22 and the four output shafts 31, 32, 33 and 34 which extend outwardly through the opposite side wall 36 of the transmission assembly housing 21. The gearing interposed between the input shaft 22 and the output shafts 31, 32, 33 and 34 causes the shafts 31, 32 and 33 to rotate in a counter-clockwise direction as seen in FIGURE 3 and cause the shaft 34 to rotate in a clockwise direction.

A drive wheel 38 is rigidly secured to the output shaft 31 and is provided with a peripheral recess 39 whereby a string 41a of the sausages 42 may be received in the peripheral recess in order to be driven thereby. The sausages are encased in a tubular casing 43 which is twisted at longitudinally spaced distances to form the sausages 42. A pressure roller 44 is rotatably mounted on the free end of a lever 46 by means of a bolt 47 above the drive wheel 38. The lever 46 is rotatably mounted on a shaft 50 mounted on the side wall 36 of the transmission housing and is retained therein by a nut 51 threaded on the free end of the shaft 50. The lever 46 includes a pair of arms 53 and 54 between which the feed roller 44 is supported on the bolt 47. The bolt 47 extends through aligned apertures in the arms 53, 54 and the pressure roller. The pressure roller is also provided with a peripheral annular recess 57 in which are receivable the upper portions of the string of sausages 42 as it is moved by the drive wheel 38.

The weight of the pressure wheel 44 holds the sausages in engagement with the drive wheel. The pressure or force with which the sausages 42 are held in the recess 39 of the drive wheel 38 may be varied by the adjustment of the position of the weight 60 on the rod 61. The rod 61 has a lower end rigidly secured to the lever or bracket 46 in any suitable manner as by a weld and has a substantially horizontally extending portion 63 on which the weight 60 is adjustably slidably mounted. A set screw 64 on the weight is provided for rigidly securing the weight in any adjusted position on the rod 61. It will be apparent that the force or pressure exerted by the pressure roller 44 will increase as the position of weight 60 is shifted towards the free end of the rod 61 and conversely will decrease as the position of the weight or mass 60 is shifted in the opposite direction away from the free end of the rod 61. It will thus be seen that the pressure wheel 44 and the weight 60 constitute a gravity actuated means for holding the sausages in engagement with the drive wheel. The pressure roller 44 is rotated by its engagement with the sausages as they are moved by the drive wheel 38.

A tubular guide 70 is disposed forwardly of the drive and pressure rollers to support the sausages in their movement from the drive wheel to a drive and support roller 72 rigidly secured to the output shaft 32. The tubular guide and support 70 is secured to the side 36 of the transmission housing in any suitable manner. The support and drive wheel 72 is also provided with an annular peripheral recess 74 for receiving the sausages 42.

A knife assembly 75 is pivotally secured to the side wall 36 of the transmission housing 21 by a shaft 76 and includes a bracket 77 having a hub 78 rotatably mounted on the shaft 76 and secured thereon by any suitable means. The bracket 77 has a downwardly extending portion 78 which is bifurcated to provide spaced arms 80 and 81 between which is interposed a circular knife 82 rigidly secured therebetween by a bolt 84. The bolt extends through aligned apertures in the arms 81 and the knife 82 into a threaded bore in the arm 80. While the knife 82 is held rigid during operation of the casing removing device, the bolt 84 may be loosened to rotate the knife 82 to present a fresh sharp cutting edge as required. The circular sharp cutting edge 85 of the knife 82 projects a predetermined distance below the rounded ends of the arms 80 so that the casing slitting knife 85 is permitted to cut through the casing of the sausage but will not penetrate the sausage itself, the bracket being supported on the rounded lower ends of the arms 80 and 81 of the bracket which engage the casing to hold the cutting edge of the knife above the sausages to prevent the cutting of the sausages by the slitting and cutting edge. The knife is positioned forwardly of theh tubular support guide 70 and above the driving and supporting wheel 72. The pressure with which the rounded ends of the arms 80 and 81 of the bracket 77 bear against the casing may be adjusted by means of the weight or mass 88 which is slidable on a substantially horizontal portion 89 of the rod or bracket 90 whose lower free end is rigidly secured to the bracket 78 in any suitable manner as by a weld. The weight 88 is secured in any adjusted position on the rod 90 by means of a set screw 92. It will be apparent that the force causing the knife to penetrate the casing is increased when the mass is moved toward the free end of the rod 90. It will be apparent that mass 88 and rod 90 constitute a gravity actuated means for yieldably urging the knife or slitting means toward the drive and support roller.

The output shaft 33 extends through a vacuum wheel housing secured to the wall 36 of the transmission housing by a plurality of bolts 100 which extend into threaded bores in the side wall 36. The vacuum housing 99 has an open top and a circular aperture 102 in its outer side which is closed by a disk 103 which may tightly engage the outer wall of the vacuum housing to minimize the leaking of air thereinto. A vacuum wheel 105 is disposed in the upper portion of the vacuum housing with its upper peripheral portion exposed upwardly through the open top of the vacuum housing. The vacuum wheel 105 is rigidly secured in any suitable manner to the shaft 33 which extends through the inner wall 106 of the vacuum housing, which abuts the wall 36 of the transmission housing through aligned apertures in the circular side walls 107 and 108 of the vacuum wheel and through a suitable aperture in the cover plate 103. A suitable nut 110 on the threaded outer end of the output shaft 33 retains the cover plate in position, the shaft rotating in the central aperture of the cover plate 103.

The hollow vacuum wheel has a peripheral annular wall 112 provided with circumferentially spaced radial apertures 113 which open between the exterior of the peripheral wall and the interior of the wheel so that at any moment a plurality of the apertures 113 communicate upwardly with the open upper end of the vacuum housing and downwardly with the bore of the tubular extension 115 of the vacuum housing. A conduit 117 may be secured to the tubular extension in any suitable manner and leads to a vacuum chamber, not shown, whereby air is continuously being pulled or sucked through the apertures 113 of the vacuum wheel from the open upper end of the vacuum housing to the vacuum chamber. The outer surface of the annular wall 112 of the vacuum wheel is provided with a plurality of transverse grooves or recesses 118 which communicate with the apertures 113 for a purpose to be described below.

Figure 6:
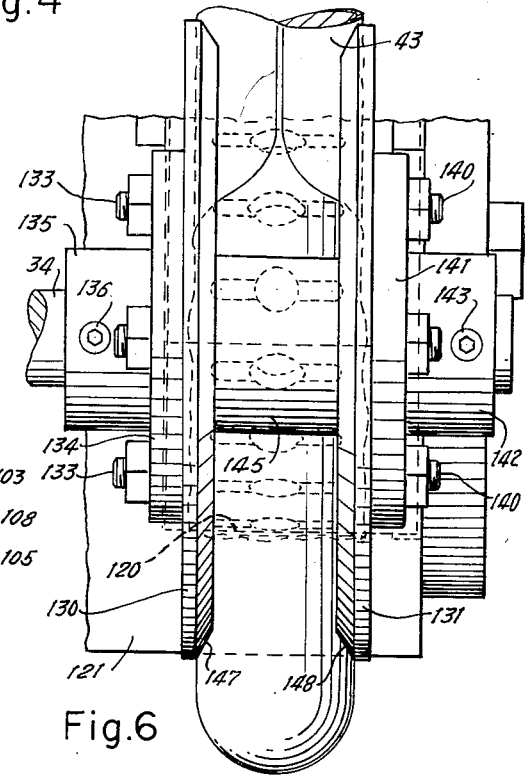
FIGURE 6 is a fragmentary view taken on line 6—6 of FIGURE 3.
Figure 7:
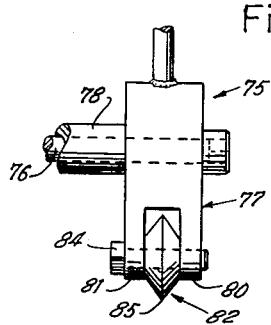
FIGURE 7 is a fragmentary top view of the knife for slitting the casing.

A narrow transverse slot 120, FIGURE 6, is provided between the periphery of the vacuum wheel and the front wall 121 of the vacuum housing so that the casing of a string of sausages, which is held to the periphery of the wheel by the suction of the vacuum, may pass through the slot into the vacuum housing and thence through the conduit 117 into the vacuum chamber. The vacuum housing is also provided with a rearwardly extending extension or guide 125 which extends toward the support guide wheel 72 to support the sausages as they move from the support guide wheel 72 and the knife assembly 77 to the upper peripheral portions of the vacuum wheel.

A pair of stripper wheels 130 and 131 are rigidly mounted on the output shaft 34 which is spaced above and slightly forward of the output shaft 33 to which the vacuum wheel is rigidly secured. The stripper wheel 130 is provided with embedded bolts 133 which extend outwardly through registering apertures in the annular flange 134 of a hub 135 rigidly secured to the output shaft 34 in any suitable manner, as by a set screw 136. The stripper wheel 131 is provided with similar bolts or threaded lugs 140 which extend laterally outwardly through an annular flange 141 of a hub 142 rigidly secured to the output shaft 34 by any suitable manner, as a set screw 143. A spacer sleeve 145 is disposed on the output shaft 34 between the confronting sides of the stripper wheels 130 and 131 to maintain them in properly spaced relationship.

The stripper wheels 130 and 131 are provided with inwardly convergently extending surfaces 147 and 148, respectively, which are adapted to engage the split casing of a sausage as the sausage moves from the support and guide wheel 72 and over the vacuum wheel 105 to cause the casing on opposite sides of the slit formed therein by the knife 82 to move downwardly and outwardly to free the sausage therefrom and cause the casing to be easily pulled by the vacuum wheel to the vacuum housing and thence through the conduit 117 into a suitable vacuum chamber.

The transmission assembly between the input shaft 22 and the output shaft provides for uniform peripheral speeds of the drive wheel 38, the drive and support wheel 72 and the vacuum wheel 105. The speed of the rotation of the output shaft 34, however, is such that the stripper wheels 34 have a peripheral speed, at the points of contact with the casing, which is slightly greater than the peripheral speed of the vacuum wheel 105 so that the stripper wheels, which may be of rubber or other slightly resilient substance, at their engagement with the casing faciiltate the outward stripping of the split casing on opposite sides of the sausages 42 as they pass between the vacuum wheel and the stripper wheels. As a result, the vacuum wheel, in coaction with the vacuum provided thereto through the vacuum housing, does not need to exert any substantial forces on the casing to cause it to peel or strip from the sausages, sufficient vacuum being needed only to cause the casing to adhere to the vacuum wheel to move the stripped casing through the vacuum housing and the vacuum conduit into the vacuum chamber. The vacuum chamber is maintained under a vacuum by a suitable pump. The casing deposited in the vacuum chamber is removed therefrom for disposal at desired intervals.

In order to facilitate the slitting or cutting of the casing 43, a steam chest 150 is provided rearwardly of the drive wheel 38 so that the string of sausages move into the steam chest through inlet aperture 151 and out of the steam chest through an outlet fitting 151a. The string of sausages is supported during its passage through the steam chest by a spiral member or spring 154 whereby the moist heat provided by the steam which enters into the steam chest through the inlet conduit 156 and exits through the outlet conduit 157, causes the moisture within the casing to become heated which tends to cause the casing to swell somewhat and separate from the sausage due to the generation of fluid pressure within the sausages whereby the knife may cut through the casing without touching the sausage itself.

In use, a string of sausages 41 is threaded through the steam chest and the casing covering the initial end pair of sausages is slit and placed into contact with the peripheral outer wall of the hollow vacuum wheel. The vacuum holds the casing in contact with the vacuum wheel until it passes into the vacuum housing whereupon the vacuum no longer acts upon the casing which thus falls freely by its own weight into the vacuum conduit 117. The circular knife 82 is then in engagement with the casing enclosing the next sausage 42 so that when the motor 14 is started by the actuation of the usual switch, the string of sausages, due to the action of the drive wheel 38, will be pulled through the steam chest wherein the sausages are heated and past the cutting knife 82 which slits the casing.

The pressure roller pivots substantially vertically about the pivot shaft 50 as required by the variations in the contours of the sausages to hold the sausages in the arcuate recess 39 of the drive wheel 38. The effective force or pressure exerted on the sausages may be adjusted as required by shifting the weight or mass 60 to insure a proper engagement of the sausages with the drive wheel 38. The movement of the sausages is also expedited by the rotation of the drive and support wheel 72 past the knife 82. The force with which the rounded shoulders of the arms 80 and 81 of the knife bracket 77 is adjusted as required by shifting or adjusting the position of the mass or weight 88 on the rod 90. Since the casing is slightly separated from the sausage due to the heating thereof in the steam chest, the circular knife protrudes just sufficiently beyond the rounded edges of the bracket 78 to cause the knife edge to penetrate or slit the sausage casing but not to penetrate into the sausage itself.

The sausages with the casing slit longitudinally along the upper surface of the sausage then pass over the guide 125 of the vacuum housing in between the vacuum wheel and the stripper wheels. During such movement, the stripper wheels engage the slit casing on each side of the slit and move it laterally outwardly and downwardly off the sausage so that the split casing is easily movable by the vacuum wheel to whose upper portions it clings due to the action of the vacuum. The force of the vacuum is exerted along a substantial transverse width of the hollow vacuum wheel due to the provision of the transverse recesses 118 which communicate with the apertures 113. The sausages thus freed from the casing are then moved by the stripper wheels and by the hollow vacuum wheel to fall free off the end of the device as illustrated in FIGURE 3.

It will now be apparent that a new and improved device for stripping casing from sausages has been illustrated and described which is provided with a drive wheel for engaging the string of sausages and moving them toward a slitting knife, the sausages being held in driven engagement with the driving wheel 38 by the pressure wheel or roller 45, the mass or weight 60 being adjustable on the rod 61 to adjustably vary the force exerted by the pressure roller on the sausages which holds them in engagement with the driving wheel 38.

It will further be apparent that a drive and support wheel 32 is also provided for supporting the sausages as they are moved past a knife 82 which slits the casing and therefore with which the knife is forced into engagement with the casing is adjustable by means of the mass or weight 88. The force with which the knife bears against the casing may thus be varied as required due to variations in the strength of the casing, the shape of the sausages, the sharpness of the knife and any other variable factors.

It will further be seen that stripping rolls are provided having convergently extending annular surfaces engageable with the split casing to force it downwardly on opposite sides of the sausages and to free the sausages of the casing and that a vacuum wheel for suctionally engaging the stripped casing engages the casing as it is stripped off the sausages and moves it under the effect of suction or vacuum to a vacuum chamber from which it may be removed for disposal at stated intervals as required.

It will further be seen that the vacuum wheel does not have to exert any substantial force to strip the casing off the sausages since this function is performed by the stripping wheel so that a minimum vacuum is required to effect the removal of the casing then to the vacuum chamber through the vacuum housing.

It will further be seen that the device for stripping casing from the string of sausages is simple in structure and mode of operation and thus is easily maintained with a minimum expenditure of time and labor.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A device for stripping casing from a string of sausages including: a drive and support roller having a peripheral annular recess for receiving lower portions of the string of sausages; a casing slitting means mounted above said drive and support roller for vertical movement toward and away from said drive and support roller; means for yieldingly urging said slitting means toward said drive and support roller, and stripping means disposed forwardly of said slitting means for stripping casing from a string of sausages which have been slit by said slitting means comprising a pair of laterally spaced wheels having convergently inwardly disposed annular surfaces for engaging a casing on opposite sides of a sausage to strip it laterally downwardly off a sausage.

2. A device for stripping casing from a string of sausages including: a drive and support roller having a peripheral annular recess for receiving lower portions of the string of sausages; a casing slitting means mounted above said drive and support roller for vertical movement toward and away from said drive and support roller; means for yieldingly urging said slitting means toward said drive and support roller, and a casing stripping means disposed forwardly of said slitting means for stripping casing from a string of sausages which has been slit by said slitting means; said stripping means comprising a pair of laterally spaced wheels having convergently inwardly disposed annular surfaces for engaging a casing on opposite sides of a sausage to strip it laterally downwardly off a sausage, said stripping means including a wheel disposed below said stripping wheels for supporting a sausage engaged by said stripping wheels.

3. A device for stripping casing from a string of sausages including: a drive and support roller having a peripheral annular recess for receiving lower portions of the string of sausages; a casing slitting means mounted above said drive and support roller for vertical movement toward and away from said drive and support roller; means for yieldingly urging said slitting means toward said drive and support roller; a casing stripping means disposed forwardly of said slitting means for stripping casing from a string of sausages which has been slit longitudinally by said slitting means, said stripping means including a pair of laterally spaced wheels having convergently inwardly disposed annular surfaces for engaging a casing on opposite sides of a sausage to strip it laterally downwardly off a sausage; and a wheel disposed below said stripping wheels for supporting a sausage engaged by said stripping wheels, said supporting wheel having a plurality of apertures and being disposed in a housing having an open top, an upper peripheral portion of the wheel being exposed through said open top of the housing and a lower end of said housing being connectable to a vacuum producing source whereby casing stripped off sausages by the stripping wheels is held in engagement with said support wheel and moved into said housing.

4. A device for stripping casing from a string of sausages including: a drive and support roller having a peripheral annular recess for receiving lower portions of the string of sausages; a casing slitting means mounted above said drive and support roller for vertical movement toward and away from said drive and support roller; means for yieldingly urging said slitting means toward said drive and support roller; a casing stripping means disposed forwardly of said slitting means for stripping casing from a string of sausages which has been slit by said slitting means, said stripping means including a pair of laterally spaced wheels having convergently inwardly disposed annular surfaces for engaging a casing on opposite sides of a sausage to strip it laterally downwardly off a sausage; and a wheel disposed below said stripping wheels for supporting a sausage engaged by said stripping wheels, said supporting wheel having a plurality of apertures and being disposed in a housing having an open top, an upper peripheral portion of the wheel being exposed through said open top of the housing and a lower end of said housing being connectable to a vacuum producing source whereby casing stripped off sausages by the stripping wheels is held in engagement with said support wheel and moved into said housing; and drive means for rotating said drive and support roller and said support wheel in one direction about parallel spaced axes and for rotating said stripper wheels in the opposite direction about an axis parallel to said axes.

5. A device for stripping casing from a string of sausages including: a drive and support roller having a peripheral annular recess for receiving lower portions of the string of sausages; a casing slitting means mounted above said drive and support roller for vertical movement toward and away from said drive and support roller; gravity actuated means for yieldingly urging said slitting means toward said drive and support roller, said gravity actuated means being adjustably mounted on said casing slitting means whereby the force with which said slitting means is urged toward said drive and support roller may be varied; and a drive means for moving a string of sausages toward said drive and support roller and said cutting means including a drive wheel having a peripheral recess and a pressure roller disposed above said drive wheel and mounted for free movement toward and away from said drive wheel; a bracket pivotally mounted on one end, said pressure roller being rotatably mounted on said bracket at a point remote from said one end, and a mass adjustably mounted on said bracket and positionable at different distances from said one end of said bracket whereby the force tending to move said pressure roller downwardly may be adjusted.

6. A device for stripping casing from a string of sausages including: a drive and support roller having a peripheral annular recess for receiving lower portions of the string of sausages; a casing slitting means mounted above said drive and support roller for vertical movement toward and away from said drive and support roller; and gravity actuated means for yieldingly urging said slitting means toward said drive and support roller including a bracket pivotally mounted on one end, said slitting means being mounted on said bracket at a point spaced from said one end, and a mass adjustably mounted on said bracket and positionable at different distances from said one end of said bracket whereby the force tending to move said casing slitting means downwardly may be varied.

References Cited in the file of this patent

UNITED STATES PATENTS

| | | |
|---|---|---|
| 1,491,438 | Theobald | Apr. 22, 1924 |
| 2,369,360 | Martin | Feb. 13, 1945 |
| 2,800,681 | Demarest | July 30, 1957 |